United States Patent [19]

Smith

[11] Patent Number: 5,034,150

[45] Date of Patent: Jul. 23, 1991

[54] THICKENED HYPOCHLORITE BLEACH SOLUTION AND METHOD OF USE

[75] Inventor: William L. Smith, Pleasanton, Calif.

[73] Assignee: The Clorox Company, Oakland, Calif.

[21] Appl. No.: 346,770

[22] Filed: May 3, 1989

[51] Int. Cl.$^5$ .............................................. C01B 11/06

[52] U.S. Cl. .......................... 252/187.25; 252/187.24; 252/95

[58] Field of Search ........................ 252/187.25, 187.24

[56] References Cited

U.S. PATENT DOCUMENTS

| | | | |
|---|---|---|---|
| 3,560,389 | 2/1971 | Hunting | 252/95 |
| 3,843,548 | 10/1974 | James | 252/187.25 |
| 4,116,849 | 9/1978 | Leikhim | 252/103 |
| 4,116,851 | 9/1978 | Rupe et al. | 252/103 |
| 4,229,313 | 10/1980 | Joy | 252/187.25 |
| 4,337,163 | 6/1982 | Schilp | 252/96 |
| 4,388,204 | 6/1983 | Dimond et al. | 252/98 |
| 4,576,728 | 3/1989 | Stoddart | 252/102 |
| 4,588,514 | 5/1986 | Jones et al. | 252/98 |
| 4,704,226 | 11/1987 | Naylor | 252/162 |
| 4,775,492 | 10/1988 | Vipond et al. | 252/187.26 |

FOREIGN PATENT DOCUMENTS

| | | |
|---|---|---|
| 30401 | 11/1980 | European Pat. Off. . |
| 0079697 | 5/1983 | European Pat. Off. . |
| 110544 | 6/1984 | European Pat. Off. . |
| 129980 | 1/1985 | European Pat. Off. . |
| 137871 | 4/1985 | European Pat. Off. . |
| 0204472 | 10/1986 | European Pat. Off. . |
| 0233666 | 8/1987 | European Pat. Off. . |
| 01823 | 3/1986 | France . |
| 168999 | 10/1982 | Japan . |
| 2158456 | 11/1985 | United Kingdom . |

*Primary Examiner*—Robert L. Stoll
*Assistant Examiner*—Joseph D. Anthony
*Attorney, Agent, or Firm*—John A. Bucher

[57] ABSTRACT

A liquid hypochlorite bleach composition and method of use are disclosed with an alkyl ether sulfate as a single surfactant thickening agent in an amount capable of effectively thickening the composition. In another embodiment of a hypochlorite bleach composition and method of use, the composition comprises an alkyl ether sulfate in a thickening effective amount and a bleach stable cosurfactant system in an amount equal to 0–50% by wt. of the amount of the alkyl ether sulfate.

16 Claims, No Drawings

THICKENED HYPOCHLORITE BLEACH SOLUTION AND METHOD OF USE

FIELD OF THE INVENTION

The present invention relates to hypochlorite compositions broadly and a method of their use and more particularly to thickened hypochlorite compositions and a method of their use.

BACKGROUND OF THE INVENTION

Considerable art has been developed in connection with thickened hypochlorite solutions useful in a variety of applications including hard surface cleaners, disinfectants, drain cleaners and the like. The efficacy of such compositions is greatly improved by higher viscosity of the composition, for example, to increase the residence time of the composition, especially on non-horizontal surfaces.

In addition, thickening of such liquid compositions is desirable in order to minimize splashing during pouring or application of the composition. At the same time, consumer preference for a thickened product has also been well established. In any event, the term "liquid bleach composition" is employed below to refer generally to liquid compositions intended for bleaching, cleaning, clearing of drains and other related purposes within applications such as but not limited to those summarized above.

The following references disclosed a variety of thickeners for hypochlorite bleach solutions. At the same time, these references disclosed such liquid bleach compositions including various other compounds such as alkyl ether sulfate specifically to serve as surfactants or cosurfactants within the thickened hypochlorite bleach compositions. The importance of this distinction will be apparent in connection with the present invention as summarized below.

For example, U.S. Pat. No. 4,337,163 issued June 29, 1982 to Schilp disclosed thickened bleach compositions containing as a thickening agent 0.5–5% by wt. of a mixture of (1) a hypochlorite-soluble first detergent active compound selected from the group consisting of tertiary amine oxides, betaines, quaternary ammonium compounds and mixtures thereof, and (2) a second detergent active compound selected from the group consisting of surfactants including an alkali metal $C_{10-18}$ alkyl ether sulfate containing 1–10 moles of ethylene oxide and/or propylene oxide and mixtures thereof, the weight ratio of the first and second compounds being from 75:25 to 40:60, the composition further comprising from 50–350 m mol/kg of a buffer salt selected from a further defined class. The tertiary amine oxide of the first group is the preferred thickener for the composition. (Also see related EP 030401.)

The above reference is generally representative of a number of other references disclosing the use of alkyl ether sulfates in surfactant systems for thickened hypochlorite solutions. For example, U.S. Pat. No. 4,388,204 to Dimond and Murphy disclosed a thickened composition with a surfactant mixture of 10–50% sarcosinate; 3–40% alkyl ether sulfate and 30–75% alkylsulfate. Carlton, et al. in EP 137871 disclosed a thick hypochlorite solution in which 0–3% of the composition was a surfactant comprising 80–99.9% amine oxide and 0.1–20% of an anionic surfactant selected from a group including alkyl ether sulfate.

LaCroix, et al., in WO86/01823, disclosed a thickened hypochlorite solution with less than 4% amine oxide and one or more cosurfactants selected from the group of sarcosinate, alkyl ether sulfate and alkylsulfonate in amounts less than that recited for amine oxide. EP233666 to Vipond, et al. disclosed a hypochlorite solution with a $C_{8-20}$ soap precursor for in situ development of viscosity and amine oxide which could allegedly be replaced by one of a number of hypochlorite soluble surfactants including alkyl ether sulfate.

U.S. Pat. No. 4,588,514 issued to Jones, et al. disclosed a thickened hypochlorite solution with a surfactant system including relatively large amounts of amine oxides, soaps or sarcosinates for thickening and a lesser amount of alkyl ether sulfate for storage stability. Stoddart U.S. Pat. No. 4,576,728 also disclosed a thickened hypochlorite solution with amine oxide, optionally betaine in an amount equal to the amine oxide and an anionic surfactant selected from a group including alkyl ether sulfate and forming 0.1–20% of the total surfactant. (Also see related EP204472.)

JP 57168999 disclosed hypochlorite solutions thickened with expansive clay and including a surfactant such as alkylphenylether sulfate.

EP79697 to Francis employed $C_{13-18}$ alkyl dimethylamine oxides to thicken hypochlorite solutions with ionic strengths greater than 3g-mol/liter. EP110544 to Nelson employed $C_{14}$ or greater alkyl amine oxides and added salt to thicken bleach. Extra salt was not needed if $C_{16}$ or greater alkyl amine oxide were present but a shorter chain amine oxide was also needed. From a practical point of view, this is considered the same as employing two different surfactant types.

A variety of thickeners found suitable for use with hypochlorite solutions have been disclosed for example by Rupe, et al. in U.S. Pat. No. 4,116,851 which disclosed a clay thickened hypochlorite bleach which could also include other thickening agents of a polymeric type such as polystyrene, polypropylene, polyethylene or copolymers of styrene with, for example, acrylate, maleate or vinyl acetate. A similar variety of additional thickeners were disclosed by Leikhim in U.S. Pat. No. 4,116,849.

SUMMARY OF THE INVENTION

Although compositions such as those disclosed above have been found suitable for their intended purposes, there has been found to remain a need for thickened bleach solutions as defined above which are useful in a variety of applications and which offer improvements either on the basis of performance, cost or ease of manufacture (particularly with a single surfactant thickener).

More specifically, it is an object of the invention to provide such an improved composition for a thickened bleach solution and a method of use for the composition. At least in connection with certain embodiments of the invention, it is also an object of the invention to provide thickened bleach compositions which are stable over a typical storage shelf life and/or which are capable of formulation at relatively low cost.

It is a more specific object of the invention to provide a liquid bleach composition and method of use wherein the composition comprises an aqueous solution of a hypochlorite forming about 0.1 to about 10% by wt. of the composition and a thickening agent consisting essentially of an alkyl ether sulfate as a single surfactant thickener. The alkyl ether sulfate is present in the composition in an amount capable of effectively thickening the composition.

In one embodiment of the invention as defined above, the alkyl ether sulfate has an alkyl component with about 8–18 carbons and an alkylene oxide component, preferably ethylene oxide, with about 1–4 alkylene oxide monomers. The alkyl component is preferably a linear chain and also more preferably contains about 12–16 carbons.

The thickened liquid bleach composition defined above also preferably includes a source of alkalinity, such as sodium hydroxide, causing the composition or solution to have a pH of at least about 10.5, preferably at least about 11–11.5 and more preferably at least about 12. The hypochlorite also more preferably forms about 1.0–6.0% by wt. of the composition. The composition may also contain a hydrotrope or solubilizing agent and one or more bleach stable cosurfactants for purposes other than thickening. The composition may also include other adjuncts typical for use in specific applications such as those set forth above.

In accordance with the preceding objects and first preferred embodiment of the invention as summarized above, alkyl ether sulfate has been surprisingly found to be an effective single surfactant thickener for hypochlorite or liquid bleach compositions as defined above. Thickened bleach products such as hard surface cleaners and drain cleaners or drain openers, for example, may be developed with alkyl ether sulfate as a single surfactant thickener. In addition to providing effective thickening, the alkyl ether sulfate is relatively inexpensive. Furthermore, liquid bleach compositions containing hypochlorite and thickened by alkyl ether sulfate as a single surfactant thickener avoid the need for adding salt to the composition in order to increase its ionic strength, thus minimizing auto-decomposition of hypochlorite according to well known rate reactions.

Liquid bleach solutions thickened with alkyl ether sulfate as a single surfactant thickener have been found to be smooth-flowing and relatively transparent, at least at room temperature. The compositions may become opaque and/or sluggish at low temperatures; however, they appear to remain in a single phase (or as a stable dispersion) at temperatures as low as 5° F. Furthermore, upon being heated again to room temperature, they recover their original properties. These characteristics offer an improvement over many of the prior art examples of thickened liquid bleach compositions with similar viscosities.

It is yet another related object of the invention to provide a liquid bleach composition, and method of use therefor, with a hypochlorite forming about 0.1 to about 10% by wt., of the composition, a thickening agent comprising an alkyl ether sulfate in an amount capable of effectively thickening the composition and a cosurfactant system including at least one bleach stable cosurfactant in an amount equal to about 0–50% by wt. of the amount of alkyl ether sulfate.

In a cosurfactant embodiment of the invention as summarized immediately above, the alkyl ether sulfate is preferably constituted similarly as for the single surfactant thickener embodiment summarized above.

In the cosurfactant embodiment, the alkyl ether sulfate forms generally about 0.1–10% by wt. of the composition, more preferably about 0.5–3.0% by wt. Cosurfactants are also selected for bleach stability and may also offer additional thickening capabilities along with the primary thickening function of the alkyl ether sulfate.

Nonsurfactant cothickeners may also be included in the composition in combination with the alkyl ether sulfate and in amounts capable of enhancing primary thickening of the composition accomplished by the alkyl ether sulfate.

Additional objects and advantages of the invention are made apparent, at least to those skilled in the art, in the following Detailed Description of the Preferred Embodiments of the invention.

DETAILED DESCRIPTION OF THE PREFERRED EMBODIMENTS

The different embodiments of the present invention commonly relate to liquid bleach compositions which may be adapted for a variety of specific applications as noted above. In any event, the compositions commonly comprise an aqueous solution of a hypochlorite of an alkali metal, preferably forming about 0.1 to about 10% by wt. of the composition.

Alkyl ether sulfate is present in the composition either as a single surfactant thickener, in accordance with various embodiments of the invention defined in greater detail below, or as a primary thickener in other embodiments. In those other embodiments, cosurfactants and-/or cothickeners may also be included in the composition to the extent that they are capable, in combination with the alkyl ether sulfate, of enhancing primary thickening of the composition by the alkyl ether sulfate. Accordingly the invention may include additional bleach stable cosurfactants for purposes other than thickening. In addition, where the alkyl ether sulfate is a primary thickening agent in the composition, other cosurfactants or nonsurfactant cothickeners may also be included in the composition as noted immediately above.

Other substituents or adjuncts may be included in the various embodiments of the liquid bleach compositions of the present invention, particularly depending upon the specific application contemplated for the composition. For example, such adjuncts may include a source of alkalinity for adjusting pH of the composition, electrolytes, buffers, builders, fragrances, colorants, fluorescent whitening agents (FWA), etc.

In the following description, essential substituents of the composition are first described in detail below followed by other possible adjuncts in the composition. Thereafter, an experimental section is set forth with a number of examples corresponding with various embodiments of the invention.

Initially, the hypochlorite component of the composition may be provided by a variety of sources. Hypochlorite compounds or compounds producing hypochlorite in aqueous solution are preferred (although hypobromite compounds or hypobromite precursors may also be suitable). Representative hypochlorite-producing compounds include sodium, potassium, lithium and calcium hypochlorite, chlorinated trisodium phosphate dodecahydrate, potassium and sodium dichloroisocyanurate and trichlorocyanuric acid. Other N-chloro imides, N-chloro amides, N-chloro amines, and chloro hydantoins are also suitable.

As noted above, the hypochlorite is present in the composition in an amount equal to about 0.1 to about 10% by wt. of the composition. Preferably or at least in certain embodiments or applications of the invention, the hypochlorite may form about 1.0–6.0% by wt. of the composition for increased stability.

The alkyl ether sulfate component of the invention preferably includes an alkyl component with about 8–18 carbons and an alkylene oxide component with about 1–4 alkylene oxide monomers. The alkyl component may be either of a branched or linear chain type, although linear alkyl components are generally preferred. At the same time, the alkylene oxide component may be comprised, for example, of ethylene oxide or propylene oxide, for example, although ethylene oxide is the preferred alkylene oxide component.

Especially where the alkyl component is linear, it preferably contains about 12–16 carbons. It should also be noted that the preferred number of carbons in the alkyl component tends to increase for branched chains as compared to linear chains, at least where the number of alkylene oxide units remains the same. Generally, branched chains, for example, methyl groups, do not influence overall properties of the alkyl component as much as those properties can be varied by adding one or more carbons to the linear chain of the alkyl component. Alkoxy and halogen substituents are also suitable.

Accordingly, the alkyl ether sulfate selected as the single surfactant thickener or the primary thickener as discussed above may have a general structure as shown below:

$$CH_3(CH_2)_n—CH_2—O(CH_2CH_2—O)_mSO_3^-\ X^+$$

wherein n equals 6–16, preferably 10–14 (at least for linear chain types), m equals 1–4 and X equals sodium, potassium or other bleach stable cations.

As noted above, cosurfactants which are added to the composition either for supplemental thickening or non-thickening purposes (such as cleaning, improving phase stability, etc.) are initially selected upon the basis of being bleach stable. Generally, a wide variety of surfactants may be stable in the presence of bleaches such as hypochlorite in a aqueous solution including but not limited to amine oxides, betaines, sarcosinates, taurates, alkyl sulfates, alkyl sulfonates, alkyl aryl sulfonates, alkyl phenol ether sulfates, alkyl diphenyl oxide sulfonates, alkyl phosphate esters, etc. Generally, such cosurfactants may be any of a variety of different types including anionics, non-ionics, amphoterics, etc. A preferred cosurfactant is myristyl dimethyl amine oxide, which is uncharged at the pH of typical bleach solutions.

As a further preferred example, lauroyl sarcosinates are a preferred anionic cosurfactant since they are particularly resistant to oxidation by bleach materials such as hypochlorite. Accordingly, these materials are bleach-resistant, even at elevated temperatures. Specific examples include surfactants sold under the trademarks Ammonyx MO (lauryl dimethyl amine oxide) and Hamposyl L (sodium lauroyl sarcosinate). The former is manufactured and marketed by Stepan Chemical Company and the latter by W.R. Grace and Company. Hydrotropes such as alkyl benzene sulfonates and alkyl naphthalene sulfonates are also useful. A suitable specific hydrotrope is sodium xylene sulfonate.

In any event, the specific identity of the cosurfactant is not critical to the present invention as long as it is bleach stable and compatible with the other components of the composition to perform either non-thickening surfactant functions or even supplemental thickening in combination with alkyl ether sulfate as the primary thickener in accordance with the preceding discussion.

Non-surfactant cothickeners, as contemplated in the present invention, may include but is not limited to products such as expansive clays, colloidal silicas, aluminas and bleach resistant polymers. Co-thickeners of both a surfactant type and a nonsurfactant type are also listed and discussed at length in various of the references set forth above in the background discussion of the invention. Accordingly, those references are incorporated herein by reference.

In most formulations contemplated by the present invention it is also important to provide a source of alkalinity such as carbonate, silicate, hydroxide, tri- or di-basic phosphate salts. A strong base such as sodium hydroxide is preferred in order to properly adjust the pH of the composition. As noted above, such a strong base is added in sufficient quantities to raise the pH of the composition or solution generally above about 10.5, preferably above about 11–11.5 and more preferably above about 12.

As noted above, electrolytes may also be added to the composition of the present invention either alone or in combination with a buffer or buffers.

Low levels of electrolytes such as sodium chloride or sodium sulfate function to provide ions in aqueous solution and have been shown to measurably improve solution viscosity under certain conditions. Sodium hypochlorite advantageously includes some sodium chloride formed during manufacture. Sodium chloride may also be added to bleaches or sodium hypochlorite solutions for increasing ionic strength. However, particularly with alkyl ether sulfate being employed as a single surfactant thickener, one of the advantages of the invention is the reduced need for such an electrolyte. However, it is to be understood that electrolyte may be included, for example, particularly if necessary in combination with cosurfactants or cothickeners employed in the invention to supplement primary thickening accomplished by the alkyl ether sulfate.

Buffers act to maintain pH in the composition or solution. As noted above, an alkaline pH is favored for attaining increased viscosity and for maintaining hypochlorite stability in order to enhance bleach effectiveness over time. Most compounds serve as both buffer and electrolyte. Some also serve as builders, as is known in the art. These particular buffer-electrolyte compounds are generally the alkali metal salts of various inorganic acids such as alkali metal phosphates, polyphosphates, pyrophosphates, triphosphates, tetraphosphates, silicates, metasilicates, polysilicates, carbonates, hydroxides and mixtures thereof.

The total amount of electrolyte/buffer including that inherently present with the bleach component plus any added to the composition, may vary from 0.05% to 25%, preferably 0.5% to 15%, most preferably between 1–6%. Maintenance of the pH within the range of about 11.0 to 14.0 is essential to ensure composition stability by minimizing chemical interactions between the bleach and their components and by minimizing decomposition of the hypochlorite. Composition performance is also aided in that soil and stain removal is more effective in this pH range.

Sodium hydroxide is preferred, as noted above, in terms of its ability to provide free alkali and to aid in stabilizing the hypochlorite. Sodium hydroxide or caustic may be added in amounts from about 0.05% to 5.0%, preferably about 0.25% to 2.0%. The caustic percentage is generally maintained in the same range as the surfactant percentage in accordance with the preceding discussion for optimum stability.

Compositions formulated in accordance with the present invention may also include other components such as fragrances, coloring agents, fluorescent whitening agents, chelating agents and corrosion inhibitors (to enhance performance, stability and/or esthetic appeal of the composition). Generally, all of these substituents are also selected with the essential or at least basic characteristic of being bleach or hypochlorite resistant. Although these components are not critical according to the present invention, they are briefly discussed below in order to indicate how they may be included within the composition if desired.

Bleach-resistant fragrances such as those commercially available from International Flavors and Fragrance, Inc. may be included in compositions of the invention in amounts from about 0.01% to about 0.5% of the composition.

Bleach-resistant colorants or pigments may also be included in small amounts. Ultramarine Blue (UMB) and copper phthalocyanines are examples of widely used bleach-stable pigments which may be incorporated in the compositions of the present invention.

Suitable builders, as also discussed briefly above, may be optionally included in the compositions of the invention and include but are not limited to carbonates, phosphates and pyrophosphates. Builders function in a manner well known in the art to reduce the concentration of free calcium or magnesium ions in the aqueous solution. Certain of the previously mentioned buffer materials, for example, carbonates, phosphates and pyrophosphates, also function as builders. Typical builders which do not also function as buffers include sodium and potassium tripolyphosphate and sodium or potassium hexametaphosphate.

Suitable compositions and their method of use are believed to be clearly demonstrated from the preceding discussion. However, the compositions and methods of use contemplated by the present invention are further illustrated in the following experimental section by a number of examples carried out to demonstrate advantages of the invention.

Before proceeding with the experimental section of the description, it is initially noted that compositions such as those outlined above and set forth in the following examples may be formulated in a relatively simple manner. Usually, the base or source of alkalinity is initially added to the hypochlorite solution in order to adjust its pH and facilitate the introduction of other components. Other components besides thickeners such as the alkyl ether sulfate forming the single surfactant thickener or primary thickener and other cosurfactant thickeners or nonsurfactant cothickeners are then added to the formulation to facilitate their addition at lower viscosities. Finally, the thickeners are added as indicated above. Although such an order of addition during formulation is preferred, it is not an essential requirement of the invention and other orders of addition or methods of formulation may be employed.

A substantial number of examples of compositions according to the present invention are set forth in tabular form within Table 1 below. In all of Examples 1-29 in Table 1, alkyl ether sulfate acts either as a single surfactant thickener or as a primary thickener in accordance with the preceding description. The wt. % of alkyl ether sulfate is set forth for each of the examples generally within ranges such as those specified above.

The alkyl group for the alkyl ether sulfate employed in each of the examples is identified by a letter corresponding to a specific alkyl group identified following Table 1. It is particularly important to note that all of the alkyl ether sulfates employed in the various examples included alkyl groups formed by mixtures or blends of different alkyl chain lengths.

The number of moles of alkylene oxide or more specifically ethylene oxide, is also specified for each of the examples within the general range noted above. The alkylene oxide number are also averages of mixtures.

Various additives in specified amounts and type are set forth for certain of the examples. The additives include either dimethylalkylamine oxide (indicated in the table as DMADO) or sodium xylene sulfonate (indicated in the table as SXS). The designations AES and EO, as employed in the table, are also defined as referring respectively to sodium alkyl ether sulfate and ethylene oxide.

All of the examples contained sodium chloride and sodium carbonate from the manufacturer of the sodium hypochlorite. Sodium silicate was also included in Examples 1-26, having a $SiO_2/Na_2O$ ratio of 3.22.

Viscosities at 3 rpm and 30 rpm respectively were measured at 73°-77° F. with a Brookfield rotoviscometer Model LVTD using a cylindrical spindle #2.

Accordingly, Examples 1-29 are set forth in Table 1 below.

TABLE 1

Examples of Bleach Thickened with Alkyl Ether Sulfates

| Ex. No. | AES Wt % | AES Alkyl Group | AES Moles EO | Co-Surfactant Wt % | Co-Surfactant Type | Wt % NaOCl | Wt % NaOH | Wt % NaxSiOy | Viscosity 3 rpm | Viscosity 30 rpm | No. of Phases °F. 35 | 70 | 100 | 120 |
|---|---|---|---|---|---|---|---|---|---|---|---|---|---|---|
| 1 | 1.00 | A | 3 | | | 5.80 | 1.88 | 0.11 | 390 | 312 | C | 1 | 1 | 2 |
| 2 | 1.50 | A | 3 | | | 5.80 | 1.88 | 0.11 | 820 | 649 | C | 1 | 1 | 2 |
| 3 | 2.00 | A | 3 | | | 5.80 | 1.88 | 0.11 | 1290 | >1000 | C | 1 | 1 | 2 |
| 4 | 3.00 | A | 3 | 0.30 | DMADO | 5.80 | 1.33 | 0.11 | 270 | 304 | C | 1 | 2 | 2 |
| 5 | 1.00 | A | 3 | 0.05 | SXS | 5.80 | 1.75 | 0.11 | 280 | 220 | C | 1 | 2 | 2 |
| 6 | 1.00 | A | 3 | 0.10 | SXS | 5.80 | 1.75 | 0.11 | 240 | 198 | C | 1 | 2 | 2 |
| 7 | 1.00 | A | 3 | 0.20 | SXS | 5.80 | 1.75 | 0.11 | 140 | 105 | 2 | 1 | 1 | 2 |
| 8 | 1.00 | A | 3 | 0.40 | SXS | 5.80 | 1.75 | 0.11 | 50 | 15 | 2 | 1 | 1 | 1 |
| 9 | 1.00 | B | 1 | | | 5.80 | 1.75 | 0.11 | a | 2 | | 1 | | 2 |
| 10 | 1.00 | B | 2 | | | 5.80 | 1.75 | 0.11 | a | 3 | | 1 | | 2 |
| 11 | 2.00 | B | 2 | | | 5.80 | 1.88 | 0.11 | | | | 2 | | |
| 12 | 1.00 | B | 2 | 0.30 | DMADO | 5.80 | 1.88 | 0.11 | 80 | 30 | C | C | C | C |
| 13 | 0.75 | B | 3 | | | 5.80 | 1.75 | 0.11 | a | 17 | | 1 | | 2 |
| 14 | 1.00 | B | 3 | | | 5.80 | 1.75 | 0.11 | a | 21 | | 1 | | 2 |
| 15 | 1.00 | B | 3 | 0.10 | SXS | 5.80 | 1.75 | 0.11 | 110 | 96 | 2 | 1 | 2 | 2 |
| 16 | 0.75 | C | 1 | | | 5.80 | 1.75 | 0.11 | 60 | 17 | | 1 | 1 | 1 |

TABLE 1-continued

Examples of Bleach Thickened with Alkyl Ether Sulfates

| Ex. No. | AES Wt % | AES Alkyl Group | AES Moles EO | Co-Surfactant Wt % | Co-Surfactant Type | Wt % NaOCl | Wt % NaOH | Wt % NaxSiOy | Viscosity 3 rpm | Viscosity 30 rpm | No. of Phases °F. 35 | No. of Phases °F. 70 | No. of Phases °F. 100 | No. of Phases °F. 120 |
|---|---|---|---|---|---|---|---|---|---|---|---|---|---|---|
| 17 | 1.00 | C | 1 | | | 5.80 | 1.75 | 0.11 | 40 | 20 | | 1 | 1 | 1 |
| 18 | 2.00 | C | 1 | | | 5.80 | 1.88 | 0.11 | 190 | 44 | C | C | C | 2 |
| 19 | 1.00 | C | 1 | 0.10 | SXS | 5.80 | 1.75 | 0.11 | 50 | 17 | C | 1 | 1 | 2 |
| 20 | 1.00 | C | 1 | 0.30 | DMADO | 5.80 | 1.88 | 0.11 | 20 | 7 | C | C | C | C |
| 21 | 1.00 | C | 2 | | | 5.80 | 1.75 | 0.11 | a | 3 | | 1 | | 2 |
| 22 | 1.00 | C | 2 | 0.30 | DMADO | 5.80 | 1.88 | 0.11 | 30 | 11 | C | C | C | C |
| 23 | 3.00 | C | 2 | 1.00 | DMADO | 5.80 | 1.79 | 0.11 | 390 | 106 | C | C | C | C |
| 24 | 0.75 | C | 3 | | | 5.80 | 1.75 | 0.11 | a | 15 | | 1 | | |
| 25 | 1.00 | C | 3 | | | 5.80 | 1.75 | 0.11 | 30 | 32 | | 1 | | |
| 26 | 1.00 | C | 3 | 0.10 | SXS | 5.80 | 1.75 | 0.11 | 20 | 12 | 2 | 1 | 1 | 2 |
| 27 | 1.00 | A | 3 | | | 4.00 | 1.00 | 0 | 140 | 119 | C | 1 | 1 | 2 |
| 28 | 1.00 | D | 2 | | | 4.13 | 0.56 | 0 | 160 | 146 | C | 1 | 1 | 1 |
| 29 | 1.00 | D | 2 | | | 4.03 | 0.95 | 0 | 170 | 153 | | 1 | 1 | 1 |

Alkyl Groups:
A = Alfonic 1412 by Vista; 38% C12, 60% C14, 2% C16.
B = Maprofix by Onyx; predominately C12 and C14.
C = Sipon by Alcolac; 86% C12, 14% C14.
D = Texapon by Henkel; 70% C12, 30% C14.
AES = Sodium alkyl ether sulfate.
EO = Ethylene oxide.
DMADO = Dimethylalkylamine oxide; alkyl = 5% C12, 65% C14, 30% C16
SXS = Sodium xylene sulfonate.
a = Too thin to measure
All formulas contain sodium chloride and sodium carbonate from the manufacturing of sodium hypochlorite. The sodium silicate has a $SiO_2/Na_2O$ ratio at 3.22.
Viscosities were measured at 73-77° F. with a Brookfield rotoviscometer model LVTD using cylindrical spindle #2.

The various examples in Table 1 illustrate a variety of compositions which are effectively thickened in accordance with the present invention. Generally, viscosities in the table, indicated in centipoise, (cP) units, range from an unacceptable level of 0 for certain examples to as high as 1,000 cP. Thus, the examples indicate a large number of compositions which have suitable thickening according to the present invention.

Generally, in terms of thickening, a liquid bleach solution as contemplated by the present invention is satisfactorily thickened at least for certain applications with a viscosity of at least about 20 cP. However, in certain applications, compositions with viscosities as low as 5-10 cP, for example, have been considered to demonstrate significant thickening and are accordingly contemplated by the present invention.

Suitability of the various examples in Table 1 is further demonstrated by the number of phases observed for the composition at temperatures of 35°, 70°, 100° and 120° F. The compositions are indicated as having either one phase or two phases or having a cloudy single phase (C) at each of the temperatures. Accordingly, it may also be seen that most of the formulations are suitable for use, particularly at room temperature.

It is also noted that Examples 5-8 demonstrate non-thickening cosurfactants added to the formulation of Example 1. Examples 12, 15 and 22 similarly demonstrate thickening enhancement of the formulations of Examples 10, 14 and 21 respectively.

There have accordingly been discussed above a number of embodiments and illustrative examples of formulations of liquid bleach compositions according to the present invention. Additional variations and modifications of those embodiments and examples in accordance with the invention will be apparent in addition to those specifically set forth above. Accordingly, it is to be understood that the above disclosure of the invention is not limiting but is set forth in order to facilitate an understanding of the invention. The scope of the invention including modifications and additions as noted above is defined by the following appended claims.

What is claimed is:

1. A liquid bleach composition comprising an aqueous solution of a hypochlorite of an alkali metal, the hypochlorite forming about 0.1 to about 10% by wt. of the composition, and a thickening component consisting essentially of an alkyl ether sulfate as a single surfactant thickener in an amount effective for thickening the composition to a viscosity of at least about 10 centipoise at 25° C.

2. The liquid bleach composition of claim 1 wherein the alkyl ether sulfate has an alkyl component with about 8-18 carbons and an alkylene oxide component with about 1-4 alkylene oxide monomers.

3. The liquid bleach composition of claim 2 wherein the alkyl component is a linear chain having about 12-16 carbons.

4. The liquid bleach component of claim 2 wherein the alkylene oxide component is ethylene oxide.

5. The liquid bleach component of claim 1 further comprising a source of alkalinity causing the composition to have a pH of at least about 10.5.

6. The liquid bleach composition of claim 5 wherein the composition has a pH of at least about 12.

7. The liquid bleach composition of claim 5 wherein the hypochlorite forms about 1.0-6.0% by wt. of the composition.

8. The liquid bleach composition of claim 1 further comprising a nonthickening cosurfactant for purposes other than thickening, the cosurfactant being present in the composition in an amount equal to 0-50% by wt. of the amount of the alkyl ether sulfate.

9. A method of employing a liquid bleach composition on a selected substrate comprising contacting the substrate with a composition as an aqueous solution containing a hypochlorite of an alkali metal, the hypochlorite forming about 0.1 to about 10% by wt. of the composition, and a thickening component consisting essentially of an alkyl ether sulfate as a single surfactant thickener in an amount effective for thickening the composition to a viscosity of at least about 10 centipoise at 25° C.

10. The method of claim 9 wherein the alkyl ether sulfate has an alkyl component with about 8-18 carbons and an alkylene oxide component with about 1-4 alkylene oxide monomers.

11. The method of claim 10 wherein the composition further comprises a source of alkalinity causing the composition to have a pH of at least about 10.5.

12. The method of claim 1 wherein the hypochlorite forms about 1.0-6.0% by wt. of the composition.

13. The method of claim 9 wherein the composition further comprises a nonthickening cosurfactant for purposes other than thickening, the cosurfactant being present in the composition in an amount equal to 0-50% by wt. of the amount of the alkyl ether sulfate.

14. A method of making a liquid bleach composition comprising the steps of forming an aqueous solution of a hypochlorite of an alkali metal, the hypochlorite composing about 0.1 to about 10% by wt. of the composition, and adding a thickening component consisting essentially of an alkyl ether sulfate as a single surfactant thickener in an amount effective for thickening the composition to a viscosity of at least about 10 centipoise at 25° C.

15. The method of claim 14 wherein the alkyl ether sulfate has an alkyl component with about 8-18 carbons and an alkylene oxide component with about 1-4 alkylene oxide monomers.

16. The method of claim 14 wherein the composition further comprises a nonthickening cosurfactant for purposes other than thickening, the cosurfactant being present in the composition in an amount equal to 0-50% by wt. of the amount of the alkyl ether sulfate.

* * * * *